United States Patent
Yang et al.

(10) Patent No.: US 9,600,136 B1
(45) Date of Patent: Mar. 21, 2017

(54) DATA OBJECT EXTENSIBILITY

(71) Applicant: Workday, Inc., Pleasanton, CA (US)

(72) Inventors: Erin Hsu Yang, San Francisco, CA (US); Jonathan David Ruggiero, Walnut Creek, CA (US); Charulatha Dhuvur, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 286 days.

(21) Appl. No.: 13/793,903

(22) Filed: Mar. 11, 2013

(51) Int. Cl.
*G06F 3/0481* (2013.01)

(52) U.S. Cl.
CPC .................. *G06F 3/0481* (2013.01)

(58) Field of Classification Search
CPC .......... G06F 3/0481; G06F 9/44; G06F 17/30; G06F 15/00
USPC ......................................... 715/765, 968, 224
See application file for complete search history.

(56) References Cited

U.S. PATENT DOCUMENTS

| | | | |
|---|---|---|---|
| 6,049,776 A * | 4/2000 | Donnelly et al. ............ 705/7.14 |
| 6,330,007 B1 * | 12/2001 | Isreal et al. ................... 715/762 |
| 6,442,748 B1 * | 8/2002 | Bowman-Amuah ......... 717/108 |
| 6,550,057 B1 * | 4/2003 | Bowman-Amuah ......... 717/126 |
| 6,636,242 B2 * | 10/2003 | Bowman-Amuah ......... 715/764 |
| 6,658,622 B1 * | 12/2003 | Aiken et al. .................. 715/210 |
| 6,964,010 B1 * | 11/2005 | Sharp ............................ 715/225 |
| 7,958,486 B2 * | 6/2011 | Tsyganskiy et al. ......... 717/105 |
| 8,626,617 B1 * | 1/2014 | Bhatt .............................. 705/30 |
| 8,645,170 B2 * | 2/2014 | Boone et al. ..................... 705/4 |
| 8,898,582 B2 * | 11/2014 | Law et al. ..................... 715/764 |
| 2003/0216979 A1 * | 11/2003 | Sribhibhadh et al. .......... 705/30 |
| 2005/0229096 A1 * | 10/2005 | Kiesekamp et al. .......... 715/507 |
| 2009/0125830 A1 * | 5/2009 | Marcek et al. ............... 715/771 |
| 2009/0276476 A1 * | 11/2009 | Jolly ............................. 707/204 |
| 2011/0238437 A1 * | 9/2011 | Zhou et al. ....................... 705/2 |
| 2011/0258233 A1 * | 10/2011 | Unger et al. .................. 707/783 |
| 2012/0072890 A1 * | 3/2012 | Bosworth et al. ............ 717/141 |
| 2012/0185827 A1 * | 7/2012 | Eska ......................... G06F 8/71 717/121 |
| 2014/0019840 A1 * | 1/2014 | Geithner ....................... 715/224 |
| 2014/0032441 A1 * | 1/2014 | Schlarb et al. ............... 705/348 |
| 2014/0201654 A1 * | 7/2014 | Wilhelm et al. .............. 715/765 |

* cited by examiner

*Primary Examiner* — Rashawn Tillery
(74) *Attorney, Agent, or Firm* — Van Pelt, Yi & James LLP

(57) ABSTRACT

A system for creating a custom field type comprises an input interface, a processor, and an output interface. The input interface is configured to receive an indication to create a custom field type. The processor is configured to validate a parameter of the custom field type. The output interface is configured to provide the custom field type for creating a custom field of a custom object.

20 Claims, 14 Drawing Sheets

Create Custom Currency Field Type

Custom Field Type Name: _____ 702

Web Service Alias: _____ 704

Minimum Currency Value: _____ 706

Maximum Currency Value: _____ 708

Currency Precision Value: _____ 710

Inactive? ☒ 712

[ Save ] 714

Create Custom Integer Field Type

Custom Field Type Name: _____ 902

Web Service Alias: _____ 904

Minimum Integer Value: _____ 906

Maximum Integer Value: _____ 908

Inactive? ☒ 910

Save 912

Create Custom List Field Type

Custom Field Type Name: [_____] 1102

Web Service Alias: [_____] 1104

Inactive? [☒] 1106    1108

List Values                                          1110

| Order | List Value Name | Web Service Alias |
|---|---|---|
| ▲ ▼ | List Value 1 | 001 |
| ▲ ▼ | List Value 2  1112 | 002  1114 |
| ▲ ▼ | List Value 3 | 003 |
| ▲ ▼ | List Value 4 | 004 |
| ▲ ▼ | List Value 5 | 005 |

[ Save ] 1116

Create Custom Currency Field Type

Custom Field Type Name: MyCurrency

Web Service Alias: my_currency

Minimum Currency Value: 0

Maximum Currency Value: 9999999999

Currency Precision Value: 5

Inactive?

Save

WARNING

Custom Currency Precision Value Has A Maximum Value Of 3

The Number Entered Is Too Large

Fig. 12

DATA OBJECT EXTENSIBILITY

BACKGROUND OF THE INVENTION

In an object based database system, software objects correspond to real-life entities. For example, a worker object comprises information describing a worker (e.g., worker name, title, salary, etc.,) and relationships to other business objects (e.g., supervisors, subordinates, business locations, etc.). A developer designing the object based database system can preload the system with a set of objects representing common business entities, in order to cover the basic needs of a typical business. However, many businesses have special circumstances, which cannot be addressed using the available objects or configurations of the objects.

BRIEF DESCRIPTION OF THE DRAWINGS

Various embodiments of the invention are disclosed in the following detailed description and the accompanying drawings.

FIG. 7 is a diagram illustrating an embodiment of a create custom currency field type window.

FIG. 9 is a diagram illustrating an embodiment of a create custom integer field type window.

FIG. 11 is a diagram illustrating an embodiment of a create custom list field type window.

FIG. 12 is a diagram illustrating an embodiment of a validation error for a custom currency field type.

DETAILED DESCRIPTION

Figure 1:
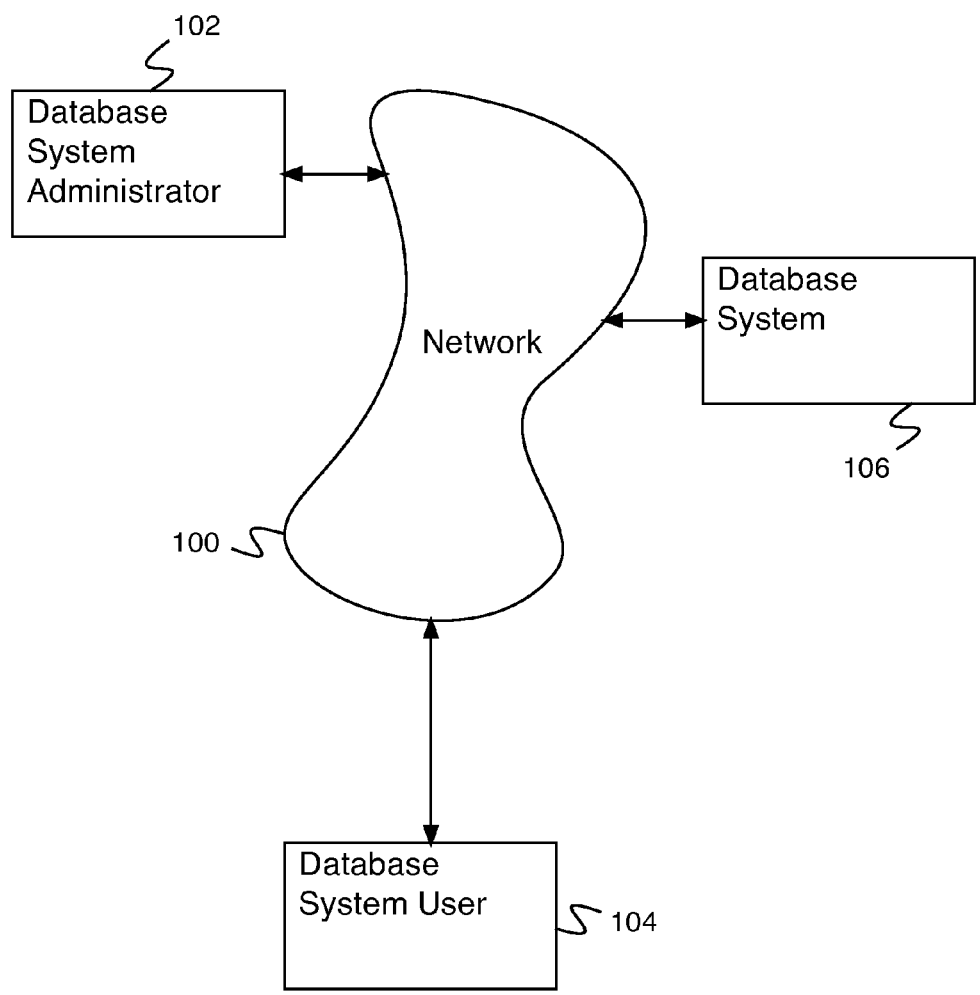
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for creating a custom field type comprises an input interface configured to receive an indication to create a custom field type, a processor configured to validate a parameter of the custom field type, and an output interface configured to provide the custom field type for creating a custom field of a custom object. The system for creating a custom field type additionally comprises a memory coupled to the processor and configured to provide the processor with instructions.

A system for data object extensibility comprises an object based database system comprising a set of data objects. A data object comprises attributes (e.g., data describing the object), relations (e.g., connections to other data objects); and methods (e.g., software for operating on the attributes and relations). A database system manager may decide it is necessary to extend an object—for instance to add new attributes to a worker object, if it is determined necessary to store new data describing the worker. For example, a company that requires its employees to have their fingerprints on file would want to store as part of a worker object information describing when a fingerprint was taken, when it was submitted to a national fingerprint database, what the results were, etc. A company requiring a security clearance would want to store information describing when the clearance was applied for, what the results were, what level of clearance an employee has, etc. The company can add this information by creating a new object that extends the worker object, and has associated with it the data fields desired.

In some embodiments, in order to make data object extensibility as flexible and as powerful as possible, a new object is created using not only the existing data types, but also using custom data types created specifically for the new object. Custom data types can include numeric data types with user-defined range and precision, a text data type with user-defined length, or a list data type with user-defined list elements. A list data type will allow a customer to specify a set of values for the field that can be chosen between. For example, a list type describing an employee security clearance might give a choice of No Clearance, Confidential, Secret, or Top Secret. A custom data type creator allows a custom data type to be created, validates the custom data type, and provides the custom data type to the custom object creator.

FIG. 1 is a block diagram illustrating an embodiment of a network system. In the example shown, the network system comprises database system administrator 102, database system user 104, and database system 106, communicating via network 100. In various embodiments, network 100 comprises one or more of the following: a local area network, a wide area network, a wired network, a wireless network, the Internet, or any other appropriate network. Database system 106 comprises a database system for storage and retrieval of information. In some embodiments, database system 106 comprises a system for analysis of information. In some embodiments, database system 106 comprises a distributed database, e.g., a database system comprising multiple computers not necessarily in the same location. In some embodiments, database system 106 comprises a system for executing business processes. In some embodiments, database system 106 comprises a system for an object-oriented database. In some embodiments, database system 106 comprises a system for data object extensibility.

Database system administrator 102 comprises a database system administrator administrating database system 106. In some embodiments, database system administrator 102 comprises an employee at a company purchasing database system services. In some embodiments, administrating database system 106 comprises preparing, configuring, or modifying database system 106 as desired by database system users (e.g., database system user 104). In some embodiments, database system administrator 102 configures and modifies database system 106 in ways not available to database system user 104. In some embodiments, database system administrator 102 extends objects of database system 106. In some embodiments, database system administrator 102 creates custom objects for database system 106. In some embodiments, database system administrator 102 creates custom fields for database system 106. Database system user 104 comprises a database user accessing database services on database system 106. In some embodiments, database system user 104 comprises a user who uses a user interface (e.g., a keyboard, a touch screen, a display, etc.) to interact with database system 106. In various embodiments, the user interface is associated with a desktop computer, a laptop computer, a local terminal, or any other appropriate system with a user interface. In some embodiments, database system user 104 comprises an employee at a company purchasing database system services. In various embodiments, there are 1, 2, 4, 13, 22, 115, or any other appropriate number of database system users accessing database services on database system 106. In some embodiments, each database system user only has access to their own data stored on database system 106 and is able to utilize database system 106 as though they are the sole database system user. In some embodiments, database system user 104 configures services on database system 106. In some embodiments, the ability of database system user 104 to configure database system 106 is limited compared with that of database system administrator 102. In some embodiments, a database system user (e.g., database system user 104) comprises a person accessing database system 106 via a user interface, e.g., a web page. In some embodiments, a database system user comprises an automated system accessing database system 106 via a machine interface, e.g., a public application programming interface (API).

Figure 2:
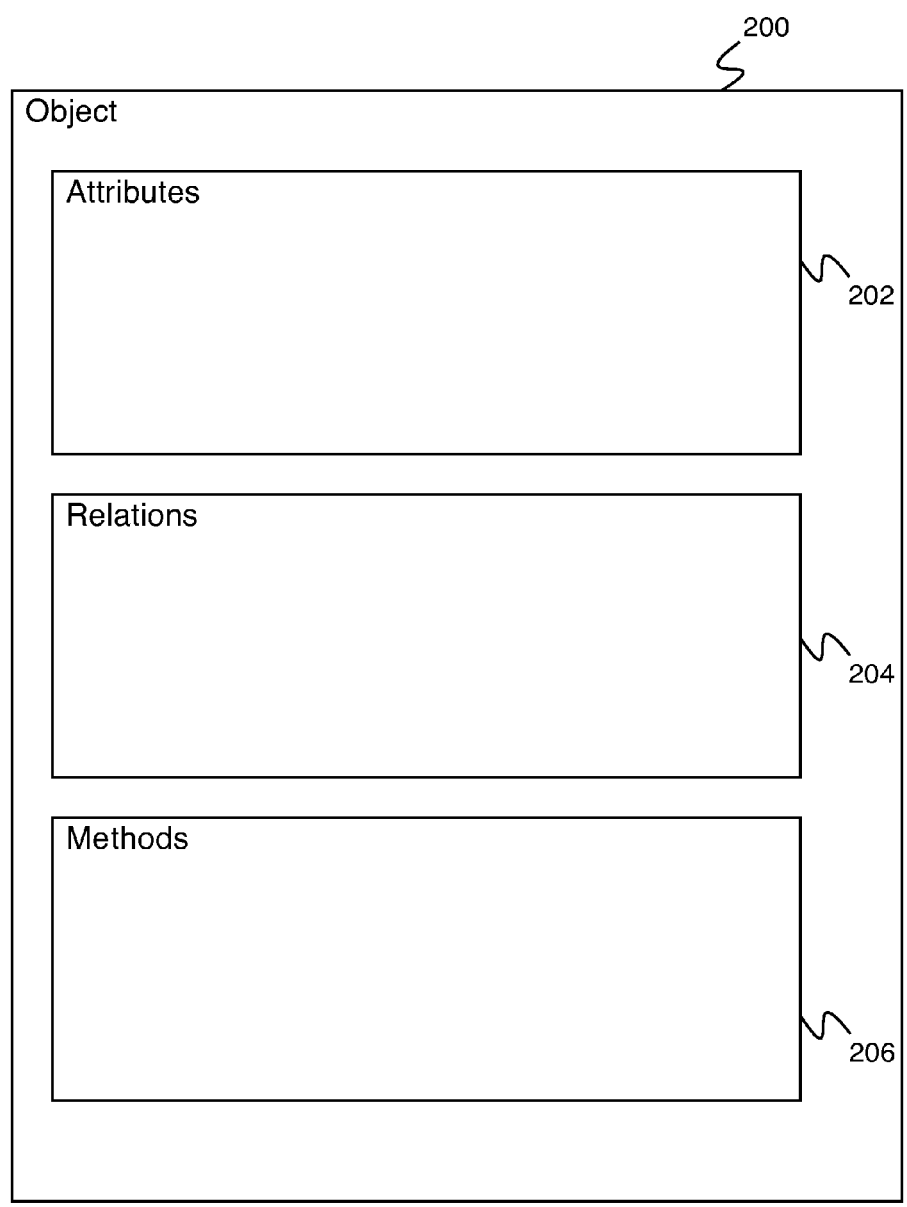
FIG. 2 is a block diagram illustrating an embodiment of an object data structure.

FIG. 2 is a block diagram illustrating an embodiment of an object data structure. In some embodiments, stored data (e.g., data stored in database system 106 of FIG. 1) is stored in object data structures of FIG. 2. In the example shown, object 200 is comprised of zero, one, or more than one attributes 202, zero, one, or more than one relations 204, and zero, one, or more than one methods 206. Attributes 202 store data about the object, for instance, name, location, salary, title, cost, vendor, or any other human resource, corporate, financial, legal, or medical data, or any other appropriate data. Relations 204 store relations between a given instance of object 200 and other instances of the object or of other objects. Methods 206 define operations that can be performed with the attributes and relations. A given object definition has a certain set of attributes and relations, as well as a certain set of methods used to operate on those attributes and relations. A given instance of an object definition comprises a set of stored values for the attributes and relations.

In some embodiments, objects can inherit from one another. When a child object inherits from a parent object, it takes on the definition of the parent object. The definition of the child object can then be extended by adding or overwriting methods, attributes, or relations. In some embodiments, objects are defined as part of software sold by a system vendor and maintained by a database system administrator (e.g., database system administrator 102 of FIG. 1). In some embodiments, a system administrator can create new objects as desired in order to customize and/or extend the software sold by the system vendor.

Figure 3:
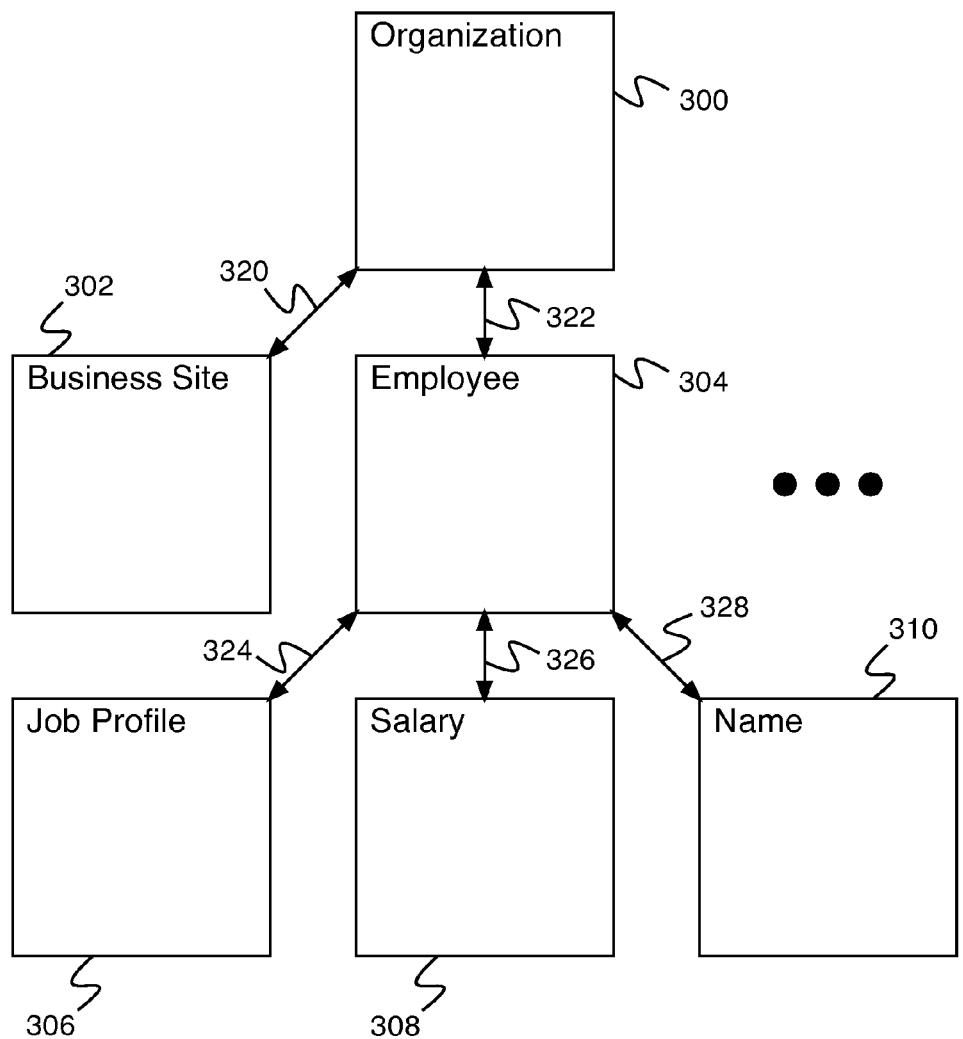
FIG. 3 is a block diagram illustrating an embodiment of a data structure for an object tree.

FIG. 3 is a block diagram illustrating an embodiment of a data structure for an object tree. In some embodiments, the object tree of FIG. 3 may comprise stored data in a database system (e.g., database system 106 of FIG. 1). In some embodiments, objects 300, 302, 304, 306, 308, and 310 comprise instances of object data structures as shown in FIG. 2. In some embodiments, relations 320, 322, 324, 326, and 328 comprise relations (e.g., relations 204 of FIG. 2). In the example shown, the object instances of FIG. 3 describe part of a business data structure. Organization 300 has relation 320 to business site object instance 302. Business site object instance 302 contains the name of the site at which the organization resides. Organization 300 also has relation 322 to employee object instances including employee object instance 304, each representing an employee that is part of the organization. Employee object instance 304 has relation 324, relation 326, and relation 328 to job profile object instance 306, salary object instance 308, and name object instance 310, respectively. Job profile object instance 306 includes job profile attributes corresponding to employee 304. Salary object instance 308 includes salary attributes corresponding to employee 304. Name object instance 310 includes name attributes corresponding to employee 304. In this way, data can be stored in a way representing the organizational structure of the company. In some embodiments, programs can access and store attribute data by traversing the object tree along the connections between object instances given by relationships, and operate on the stored attribute data to create a meaningful report about the organization.

Figure 4:
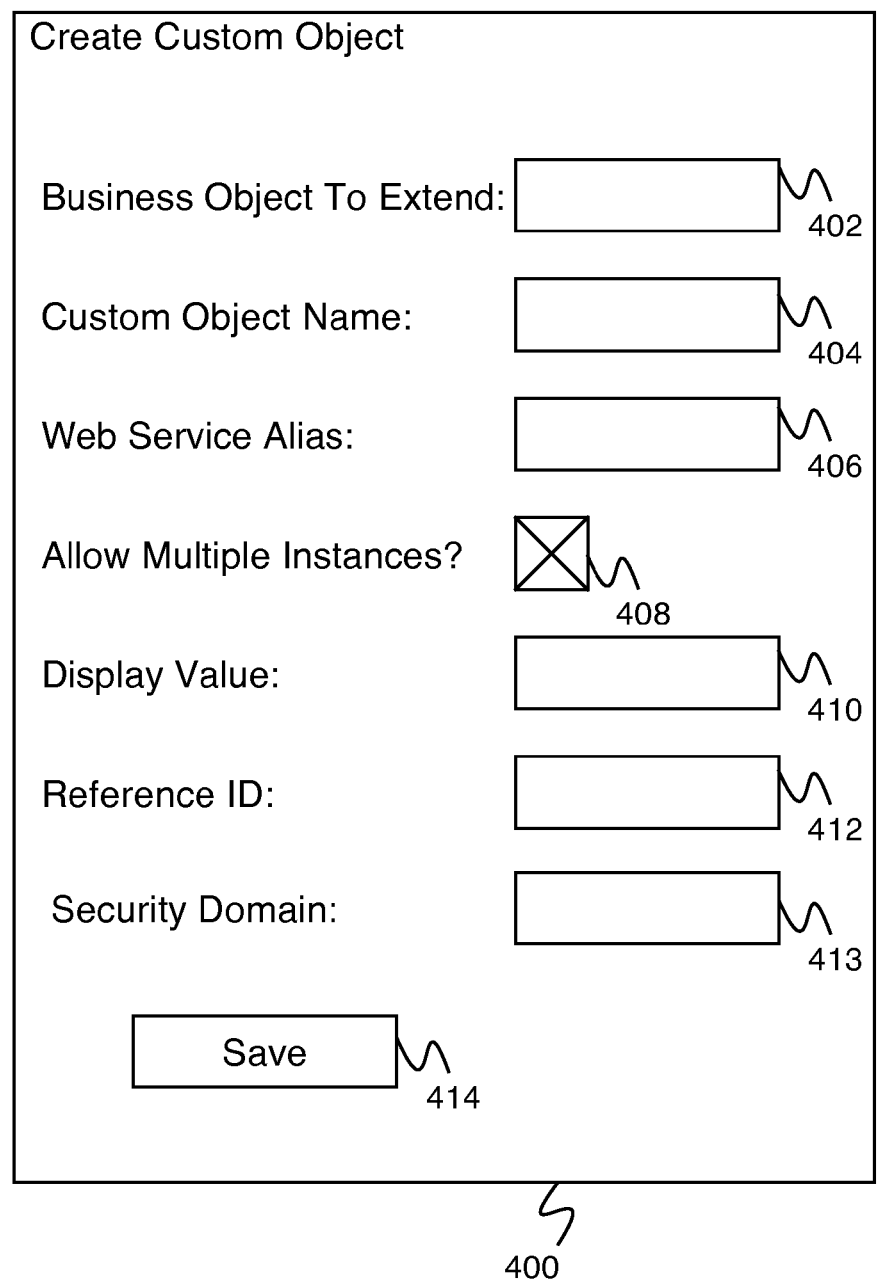
FIG. 4 is a diagram illustrating an embodiment of a create custom object window.

FIG. 4 is a diagram illustrating an embodiment of a create custom object window. In some embodiments, create custom object window 400 comprises a create custom object window for a database system administrator (e.g., database system administrator 102 of FIG. 1) to create a custom object extending an existing object. In the example shown, business object to extend field 402 comprises an input field for specifying a business object to extend. For example, if a database system administrator wishes to add fields to a worker object, he would select the worker object as the business object to extend. In some embodiments, not all business objects are available to extend. Custom object name field 404 comprises a field for specifying the custom object name. Web service alias field 406 comprises a field for specifying a web service alias for the object. In some embodiments, the object based database is accessible via a machine interface using a web service. The web service includes a predefined interface for the machine interface to use to retrieve data. When a custom object is created, it needs a new web service alias so that it can be retrieved via the web service. Allow multiple instances checkbox 408 comprises a checkbox for specifying if multiple instances of the custom object will be allowed. In some embodiments, multiple instances of the custom object can be used to specify multiple copies of the same data field for a given object. For instance, a custom object that extends the worker object to include fingerprint data fields may require multiple copies to exist if the fingerprint data is taken and sent to the fingerprint database multiple times. Display value field 410 comprises a field for specifying a data value that will be used to distinguish multiple instances of the custom object in a report (e.g., date created). Reference ID field 412 comprises a field for specifying a data value that will be used to distinguish multiple instances of the custom object in a web service request. Security domain field 413 comprises a field for specifying one or more security domains for the custom object. In some embodiments, a security domain indicates a set of employees authorized to view and/or modify the object. Save button 414 comprises a save button for saving progress creating the custom object. In some embodiments, save button 414 saves custom object creation progress and takes the user to the next custom object creation screen.

Figure 5:
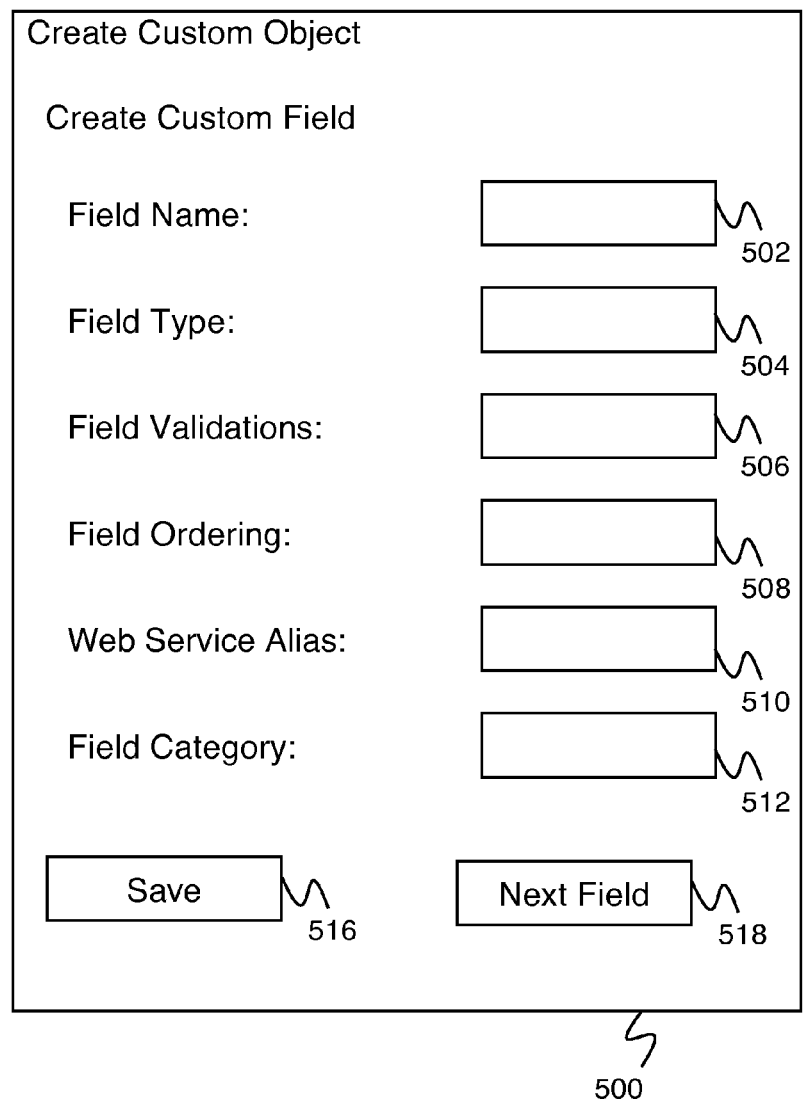
FIG. 5 is a diagram illustrating an embodiment of a create custom field window.

FIG. 5 is a diagram illustrating an embodiment of a create custom field window. In some embodiments, create custom field window 500 comprises a create custom field window for a database system administrator (e.g., database system administrator 102 of FIG. 1) to create a custom field for a custom object. In the example shown, field name field 502 comprises a field for entering a custom field name. Field type field 504 comprises a field for selecting a field type. In some embodiments, field type field 504 comprises a field for selecting a custom field type. Field validations field 506 comprises a field for entering a field validation (e.g., for indicating that the field is required to have a value). Field ordering field 508 comprises a field for indicating a field ordering (e.g., the ordering that the field is displayed). Web service alias 510 comprises a field for entering a web service alias for the field. Field category field 512 comprises a field for selecting a category for the field. In some embodiments, fields are sorted into field categories. Custom Fields Save button 516 comprises a save button for saving progress creating the custom field. Next field button 518 comprises a next field button for creating another new custom field for the custom object.

Figure 6:
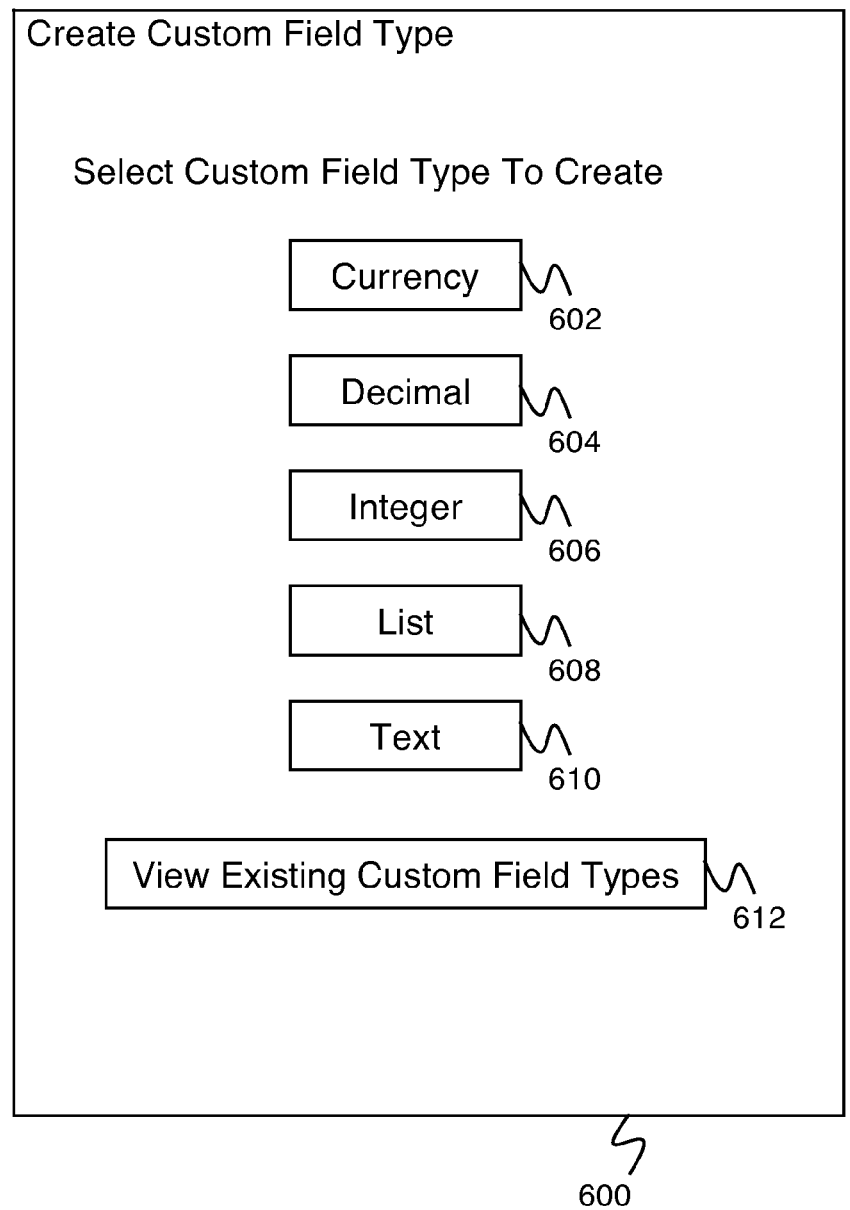
FIG. 6 is a diagram illustrating an embodiment of a select custom field type window.

FIG. 6 is a diagram illustrating an embodiment of a select custom field type window. In some embodiments, select custom field type window 600 comprises a select custom field type window for a database system administrator (e.g., database system administrator 102 of FIG. 1) to select a custom field type to begin creating a custom field type. In the example shown, currency button 602 begins creating a custom currency field type, decimal button 604 begins creating a custom decimal field type, integer button 606 begins creating a custom integer field type, list button 608 begins creating a custom list field type, and text button 610 begins creating a custom text field type. View existing custom field types button 612 displays a list of existing custom field types.

FIG. 7 is a diagram illustrating an embodiment of a create custom currency field type window. In some embodiments, create custom currency field type window 700 comprises a create custom currency field type window for a database system administrator (e.g., database system administrator 102 of FIG. 1) to create a custom currency field type. In the example shown, custom field type name field 702 comprises a custom field type name field for entering a custom field type name. Web service alias field 704 comprises a web service alias field for entering a web service alias. In some embodiments, the web service alias must be an alphanumeric text string with no spaces. Minimum currency value field 706 comprises a minimum currency value field for entering a minimum currency value. In some embodiments, the minimum currency value must be in the range of −9,223,372,036,854,775,808 to 9,223,372,036,854,775,807. Maximum currency value field 708 comprises a maximum currency value field for entering a maximum currency value. In some embodiments, the maximum currency value must be in the range of −9,223,372,036,854,775,808 to 9,223,372,036,854,775,807, and must be larger than the minimum currency value. Currency precision value field 710 comprises a currency precision value field for entering a currency precision value. In some embodiments, the currency precision value must be in the range of 0 to 3. Inactive checkbox 712 comprises a checkbox for indicating if the custom currency field type is inactive (e.g., it cannot be used). Save button 714 comprises a save button for saving the custom currency field type.

Figure 8:
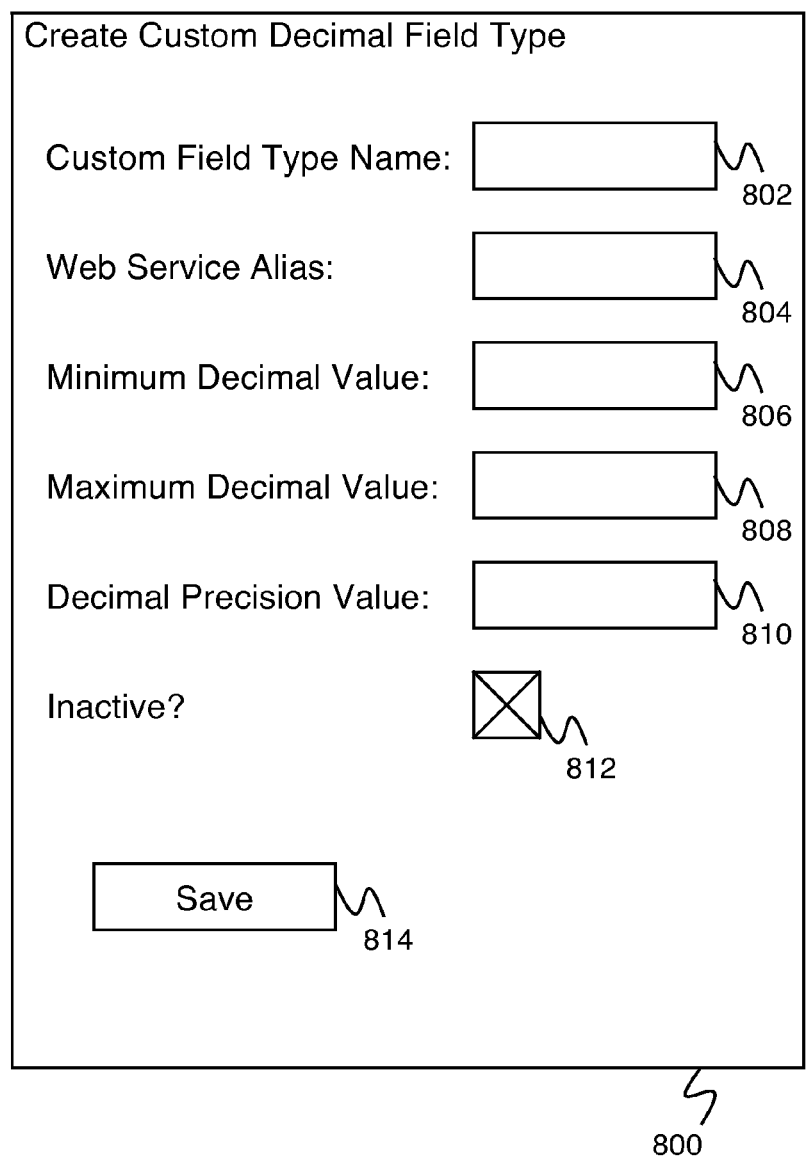
FIG. 8 is a diagram illustrating an embodiment of a create custom decimal field type window.

FIG. 8 is a diagram illustrating an embodiment of a create custom decimal field type window. In some embodiments, create custom decimal field type window 800 comprises a create custom decimal field type window for a database system administrator (e.g., database system administrator 102 of FIG. 1) to create a custom decimal field type. In the example shown, custom field type name field 802 comprises a custom field type name field for entering a custom field type name. Web service alias field 804 comprises a web service alias field for entering a web service alias. In some embodiments, the web service alias must be an alphanumeric text string with no spaces. Minimum decimal value field 806 comprises a minimum decimal value field for entering a minimum decimal value. In some embodiments, the minimum decimal value must be in the range of −9,223,372,036,854,775,808 to 9,223,372,036,854,775,807. Maximum decimal value field 808 comprises a maximum decimal value field for entering a maximum decimal value. In some embodiments, the maximum decimal value must be in the range of −9,223,372,036,854,775,808 to 9,223,372,036,854,775,807, and must be larger than the minimum decimal value. Decimal precision value field 810 comprises a decimal precision value field for entering a decimal precision value. In some embodiments, the decimal precision value must be in the range of 0 to 3. Inactive checkbox 812 comprises a checkbox for indicating if the custom decimal field type is inactive (e.g., it cannot be used). Save button 814 comprises a save button for saving the custom decimal field type.

FIG. 9 is a diagram illustrating an embodiment of a create custom integer field type window. In some embodiments, create custom integer field type window 900 comprises a create custom integer field type window for a database system administrator (e.g., database system administrator 102 of FIG. 1) to create a custom integer field type. In the example shown, custom field type name field 902 comprises a custom field type name field for entering a custom field type name. Web service alias field 904 comprises a web service alias field for entering a web service alias. In some embodiments, the web service alias must be an alphanumeric text string with no spaces. Minimum integer value field 906 comprises a minimum integer value field for entering a minimum integer value. In some embodiments, the minimum integer value must be in the range of −2,147,483,648 to 2,124,483,647. Maximum integer value field 908 comprises a maximum integer value field for entering a maximum integer value. In some embodiments, the maximum integer value must be in the range of −2,147,483,648 to 2,124,483,647, and must be larger than the minimum integer value. Inactive checkbox 910 comprises a checkbox for indicating if the custom integer field type is inactive (e.g., it cannot be used). Save button 912 comprises a save button for saving the custom integer field type.

Figure 10:
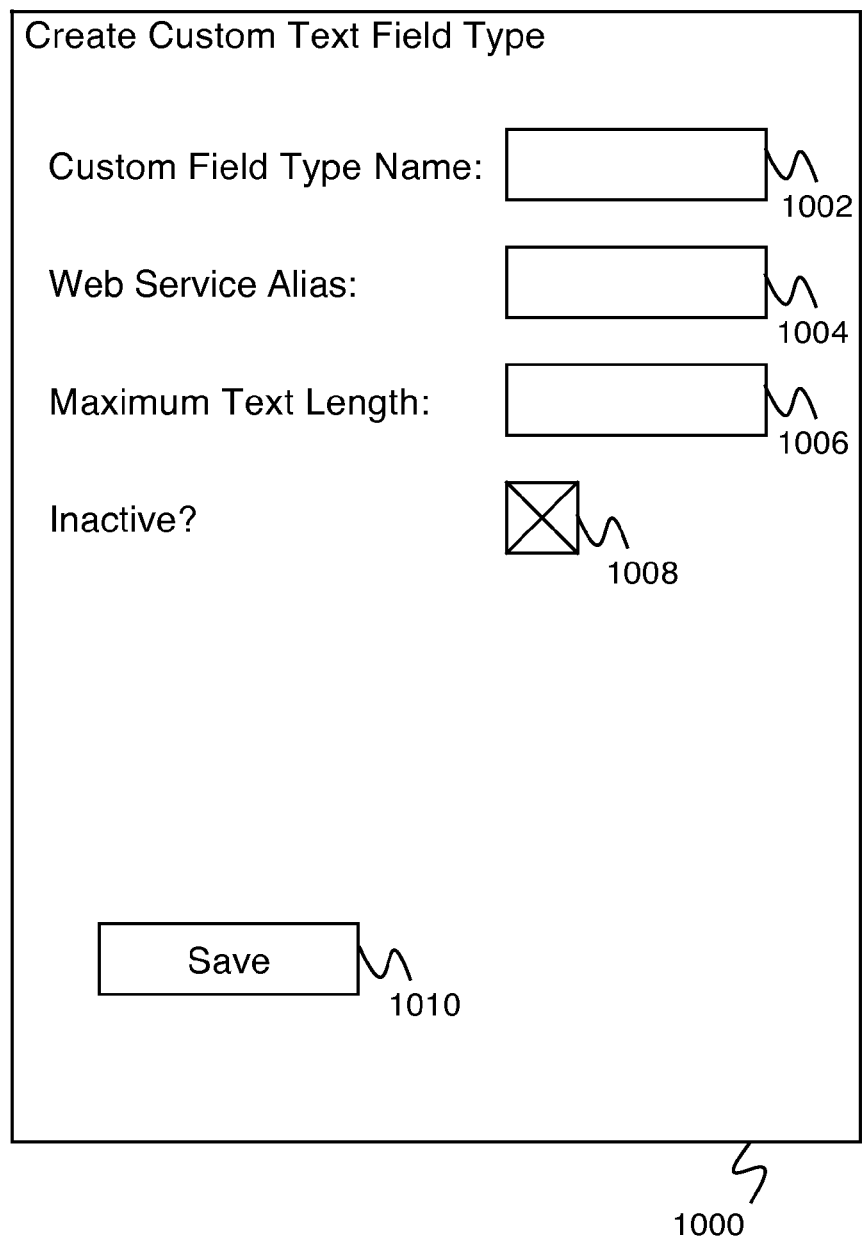
FIG. 10 is a diagram illustrating an embodiment of a create custom text field type window.

FIG. 10 is a diagram illustrating an embodiment of a create custom text field type window. In some embodiments, create custom text field type window 1000 comprises a create custom text field type window for a database system administrator (e.g., database system administrator 102 of FIG. 1) to create a custom text field type. In the example shown, custom field type name field 1002 comprises a custom field type name field for entering a custom field type name. Web service alias field 1004 comprises a web service alias field for entering a web service alias. In some embodiments, the web service alias must be an alphanumeric text string with no spaces. Maximum text length field 1006 comprises a maximum text length field for entering a maximum text length. In some embodiments, the maximum maximum text length is 255 characters. Inactive checkbox 1008 comprises a checkbox for indicating if the custom text field type is inactive (e.g., it cannot be used). Save button 1010 comprises a save button for saving the custom text field type.

FIG. 11 is a diagram illustrating an embodiment of a create custom list field type window. In some embodiments, create custom list field type window 1100 comprises a create custom list field type window for a database system administrator (e.g., database system administrator 102 of FIG. 1) to create a custom list field type. In the example shown, custom field type name field 1102 comprises a custom field type name field for entering a custom field type name. Web service alias field 1104 comprises a web service alias field for entering a web service alias. In some embodiments, the web service alias must be an alphanumeric text string with no spaces. Inactive checkbox 1106 comprises a checkbox for indicating if the custom list field type is inactive (e.g., it can not be used). List values box 1108 comprises a list values box for entering a set of list values for the custom list field type. Each list value for the custom list field type comprises a list value name (e.g., list value name 1112), a web service alias (e.g., web service alias 1114), and a position in the ordering within the set of list values. The ordering can be changed for a given list value using its associated ordering buttons (e.g., ordering buttons 1110). In some embodiments, each list value name and web service alias must be unique for a given custom list type. In some embodiments, a custom list type has a maximum of 100 list values. Save button 1116 comprises a save button for saving the custom list field type.

FIG. 12 is a diagram illustrating an embodiment of a validation error for a custom currency field type. In the example shown, a value of 5 has been entered into the currency precision value field in the create custom currency field type screen. The maximum currency precision value is 3, so the custom currency field type is not validated. Until the custom currency field type screen is validated (e.g., all fields contain legal values), the custom currency field type cannot be saved.

Figure 13:
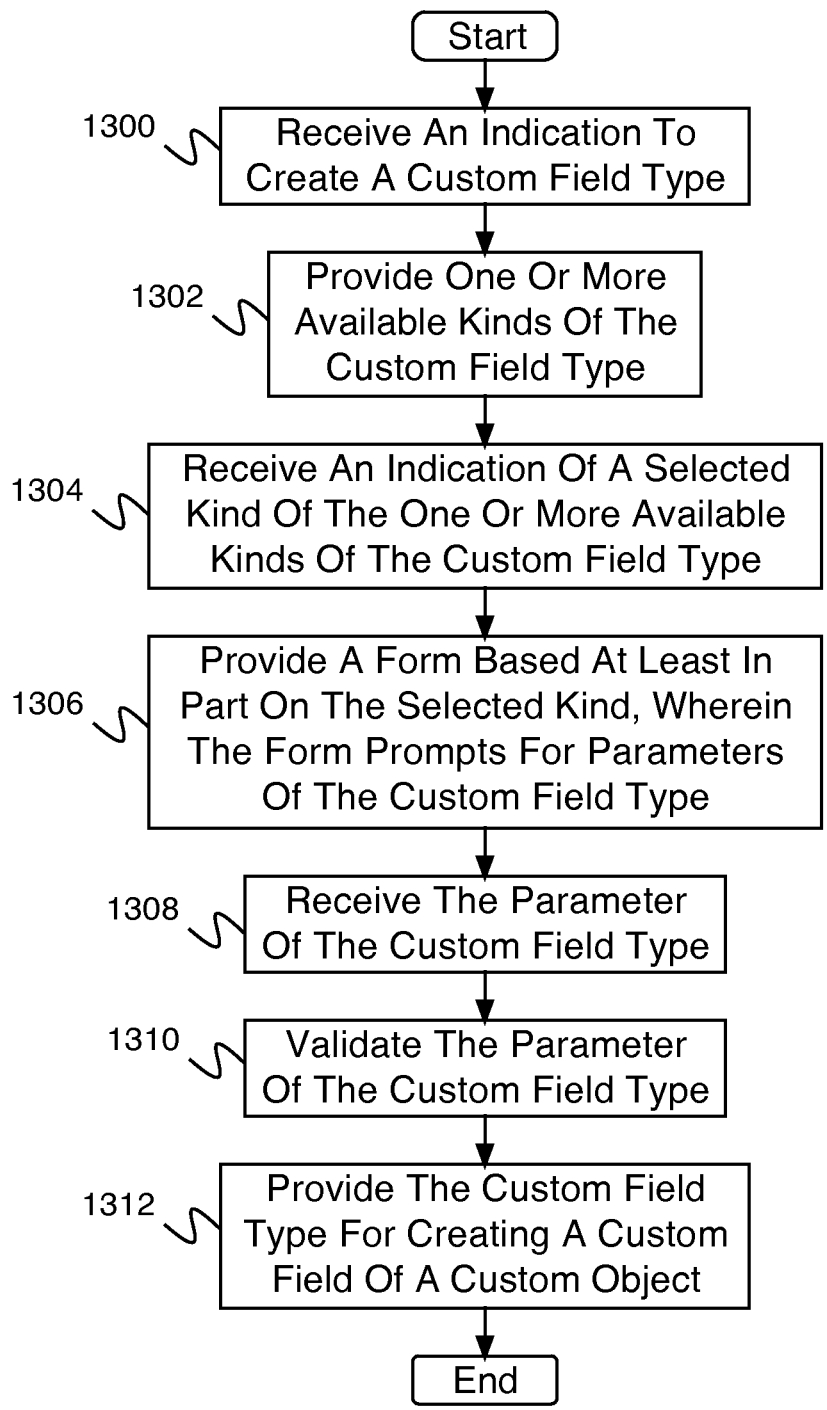
FIG. 13 is a flow diagram illustrating an embodiment of a process for creating a custom field type.

FIG. 13 is a flow diagram illustrating an embodiment of a process for creating a custom field type. In some embodiments, the process of FIG. 13 is executed by a database system (e.g., database system 106 of FIG. 1) interacting with a database system administrator (e.g., database system administrator 102 of FIG. 1). In the example shown, in 1300, an indication to create a custom field type is received. In 1302, one or more available kinds of the custom field type are provided. In 1304, an indication is received of a selected kind of the one or more available kinds of the custom field type. In 1306, a form is provided based at least in part on the selected kind, wherein the form prompts for parameters of the custom field type. In 1308, the parameter of the custom field type is received. In some embodiments, one or more parameters of a custom field type are received. In 1310, the parameter of the custom field type is validated. In some embodiments, one or more parameters of the custom field type are validated. In 1312, the custom field type is provided for creating a custom field of a custom object.

Figure 14:
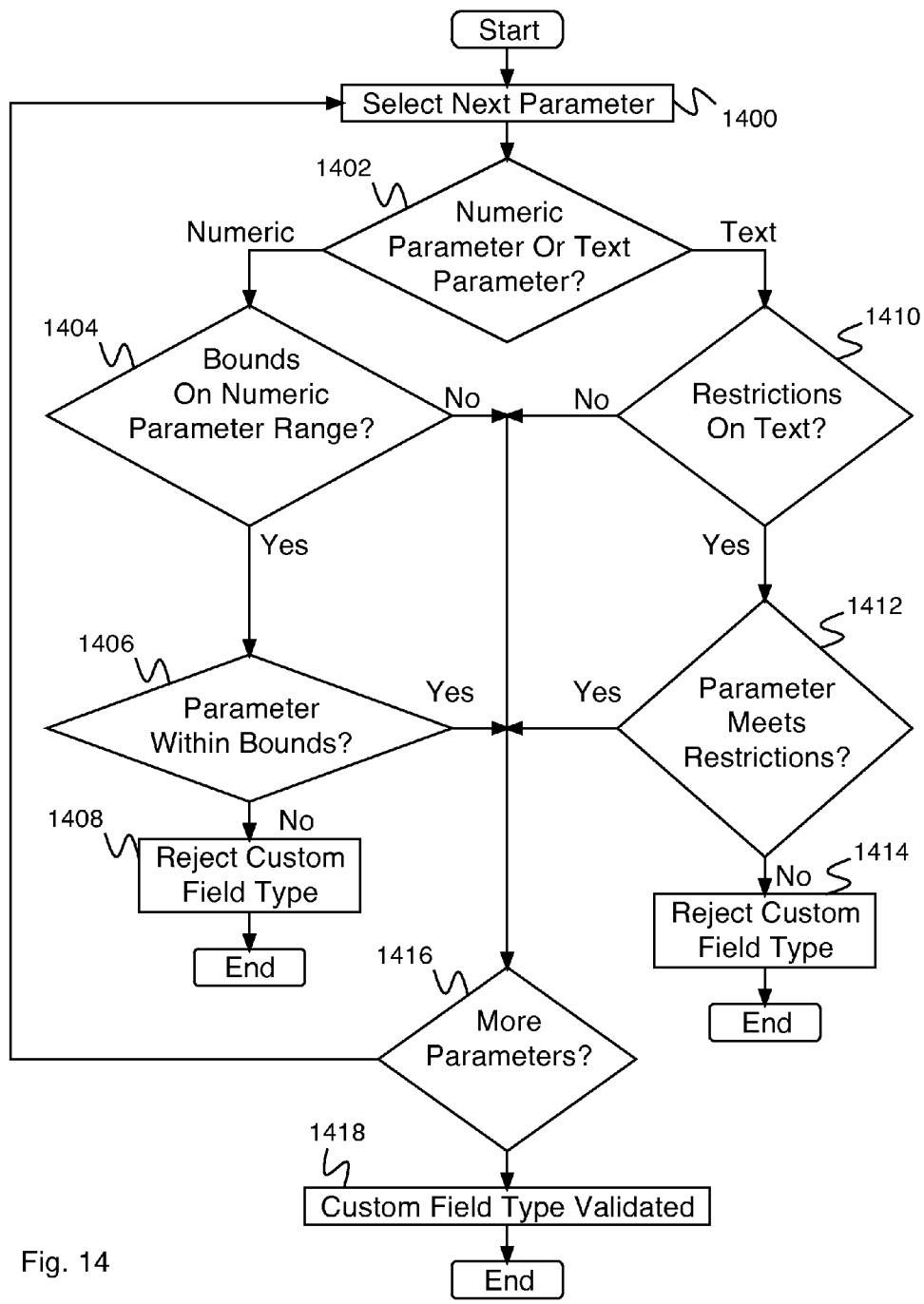
FIG. 14 is a flow diagram illustrating an embodiment of a process for validating one or more parameters of a custom field type.

FIG. 14 is a flow diagram illustrating an embodiment of a process for validating one or more parameters of a custom field type. In some embodiments, the process of FIG. 14 implements 1310 of FIG. 13. In the example shown, in 1400, the next parameter is selected. In some embodiments, the next parameter comprises the first parameter. In 1402, it is determined whether the parameter comprises a numeric parameter or a text parameter. If it is determined that the parameter comprises a numeric parameter, control passes to 1404. In 1404, it is determined whether there are bounds on the numeric parameter range. If it is determined that there are not bounds on the numeric parameter range, control passes to 1416. If it is determined that there are bounds on the numeric parameter range, control passes to 1406. In 1406, it is determined whether the parameter is within the bounds on the numeric parameter range. If it is determined that the parameter is within the bounds on the numeric parameter range, control passes to 1416. If it is determined that the parameter is not within the bounds on the numeric parameter range, control passes to 1408. In 1408, the custom field type is rejected. The process then ends.

If it is determined in 1402 that the parameter comprises a text parameter, control passes to 1410. In 1410 it is determined whether there are restrictions on the text. In various embodiments, restrictions on the text comprise restrictions on the text length, restrictions on the text character set (e.g., only alphanumeric characters, etc.), or any other appropriate restrictions on the text. If it is determined that there are not restrictions on the text, control passes to 1416. If it is determined that there are restrictions on the text, control passes to 1412. In 1412, it is determined whether the parameter meets the restrictions. If it is determined in 1412 that the parameter meets the restrictions, control passes to 1416. If it is determined in 1412 that the parameter does not meet the restrictions, control passes to 1414. In 1414, the custom field type is rejected. The process then ends.

In 1416, it is determined whether there are more parameters. If it is determined that there are more parameters, control passes to 1400. If it is determined that there are not more parameters, control passes to 1418. In 1418, the custom field type is validated, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for creating a custom field type, comprising:
 an input interface configured to:
  receive an indication to create a custom object in an object-oriented database, wherein the object-oriented database comprises a database storing objects in an object tree with relations between each object, wherein the indication to create the custom object comprises a user selection of an existing object to extend;
receive an indication to create a new custom field for the custom object;
receive an indication whether multiple instances of the new custom object are allowed in the object-oriented database, wherein multiple instances of the new custom object allows multiple copies of the new custom field for the custom object, the multiple instances of the new custom object including a first instance of the new custom object and a second instance of the new custom object;
receive a display value field for specifying a data value that is used to distinguish multiple instances of the custom object, wherein a first data value is used to distinguish the first instance of the new custom object, and wherein a second data value is used to distinguish the second instance of the new custom object, the first display value being different from the second display value;
a processor configured to:
provide one or more field types for the custom object;
receive an indication of a selection of the one or more field types;
provide a form of parameters based at least in part on the selection of the one or more field types, wherein the form prompts for parameters specific for the selection of the one or more field types;
validate the parameters of the selection of the one or more field types to create a new custom field, wherein the parameters are checked for being in bounds of a predetermined range, wherein the validating of the parameters of the selection of the one or more field types comprises to:
determine whether a parameter is a text parameter; and
in the event that the parameter is the text parameter:
determine whether the parameter is equal or less than a maximum length; and
in the event that the parameter is equal or less than the maximum length:
determine whether the parameter is a web service alias field;
in the event that the parameter is the web service alias field:
determine whether the parameter includes a space; and
in the event that the parameter includes the space,
determine that the parameter is invalid; and
in the event that the parameter is not the web service alias field, determine that the parameter is valid;
in the event that the parameters of the selection of the one or more field types do not pass validation, reject the new custom field, wherein rejecting the new custom field comprises providing a validation error with a message of an invalid parameter of the selection; and
in the event that the parameters of the selection pass validation, add the new custom field to the existing object to create the custom object;
receive a request to create a new instance of the custom field for a specific custom object;

determine whether the new instance is allowed based at least in part on the indication of whether multiple instances of the new custom field are allowed;
in the event that the new instance is allowed, allow the new instance; and
in the event that the new instance is not allowed, do not allow the new instance.

2. The system of claim 1, wherein the input interface is further configured to receive the parameters from the form for the selection of the one or more field types.

3. The system of claim 1, wherein the parameters of the selection comprises at least a field name, wherein the field name is specific for a new custom field for the custom object of the selection of one or more field types.

4. The system of claim 1, wherein the parameters of the selection comprise at least a web service alias specific for the new field.

5. The system of claim 1, wherein the selection comprises a currency type.

6. The system of claim 5, wherein a parameter of the currency type comprises one of the following: a minimum value, a maximum value, or a precision.

7. The system of claim 1, wherein the selection comprises a decimal type, wherein the form of parameters for the new decimal type includes a minimum decimal value.

8. The system of claim 1, wherein the selection comprises a decimal type, wherein the form of parameters of the new decimal type includes a maximum value.

9. The system of claim 1, wherein the selection comprises an integer type.

10. The system of claim 9, wherein a parameter of the integer type comprises one of the following: a minimum value or a maximum value.

11. The system of claim 1, wherein the selection comprises a text type.

12. The system of claim 11, wherein a parameter of the text type comprises a maximum length.

13. The system of claim 1, wherein the selection comprises a list type.

14. The system of claim 13, wherein a parameter of the list type comprises one or more list values.

15. The system of claim 14, wherein one of the one or more list values comprises a list value name.

16. The system of claim 14, wherein one of the one or more list values comprises a list value web service alias.

17. A method for creating a custom field type, comprising:
receiving an indication to create a custom object in an object-oriented database, wherein the object-oriented database comprises a database storing objects in an object tree with relations between each object, wherein the indication to create the custom object comprises a user selection of an existing object to extend;
receiving an indication to create a new custom field for the custom object;
receiving an indication whether multiple instances of the custom object are allowed in the object-oriented database, wherein multiple instances of the custom object allows multiple copies of the new custom field for the custom object, the multiple instances of the new custom object including a first instance of the new custom object and a second instance of the new custom object;
receiving a display value field for specifying a data value that is used to distinguish multiple instances of the custom object, wherein a first data value is used to distinguish the first instance of the new custom object, and wherein a second data value is used to distinguish the second instance of the new custom object, the first display value being different from the second display value;
providing one or more field types for the custom object;
receiving an indication of a selection of the one or more field types;
providing a form of parameters based at least on part on the selection of the one or more field types, wherein the form prompts for parameters specific for the selection of the one or more field types;
validating, using a processor, the parameters of the selection of the one or more field types to create a new custom field, wherein the parameters are checked for being in bounds of a predetermined range, wherein the validating of the parameters of the selection of the one or more field types comprises:
  determining whether a parameter is a text parameter; and
  in the event that the parameter is the text parameter:
    determining whether the parameter is equal or less than a maximum length; and
    in the event that the parameter is equal or less than the maximum length:
      determining whether the parameter is a web service alias field;
      in the event that the parameter is the web service alias field:
        determining whether the parameter includes a space; and
        in the event that the parameter includes the space,
      determine that the parameter is invalid; and
        in the event that the parameter is not the web service alias field, determining that the parameter is valid;
in the event that the parameters of the selection of the one or more field types do not pass validation, rejecting the new custom field, wherein rejecting the new custom field comprises providing a validation error with a message of an invalid parameter of the selection; and
in the event that the parameters of the selection pass validation, adding the new custom field to the existing object to create the custom object; and
receiving a request to create a new instance of the custom field for a specific custom object;
determining whether the new instance is allowed based at least in part on the indication of whether multiple instances of the new custom field are allowed;
in the event that the new instance is allowed, allowing the new instance; and
in the event that the new instance is not allowed, not allowing the new instance.

18. A computer program product for creating a custom field type, the computer program product being embodied in a tangible computer readable storage medium and comprising computer instructions for:
receiving an indication to create a custom object in an object-oriented database, wherein the object-oriented database comprises a database storing objects in an object tree with relations between each object, wherein the indication to create the custom object comprises a user selection of the existing object to extend;
receiving an indication to create a new custom field for the custom object;
receiving an indication whether multiple instances of the custom object are allowed in the object-oriented database, wherein multiple instances of the custom object allows multiple copies of the new custom field for the custom object, the multiple instances of the new custom object including a first instance of the new custom object and a second instance of the new custom object;
receiving a display value field for specifying a data value that is used to distinguish multiple instances of the custom object, wherein a first data value is used to distinguish the first instance of the new custom object, and wherein a second data value is used to distinguish the second instance of the new custom object, the first display value being different from the second display value;
providing one or more field types for the custom object;
receiving a indication of a selection of the one or more field types;
providing a form of parameters based at least on part on the selection of the one or more field types, wherein the form prompts for parameters specific for the selection of the one or more field types;
validating, using a processor, the parameters of the selection of the one or more field types to create a new custom field, wherein the parameters are checked for being in bounds of a predetermined range, wherein the validating of the parameters of the selection of the one or more field types comprises:
  determining whether a parameter is a text parameter; and
  in the event that the parameter is the text parameter:
    determining whether the parameter is equal or less than a maximum length; and
    in the event that the parameter is equal or less than the maximum length:
      determining whether the parameter is a web service alias field;
      in the event that the parameter is the web service alias field:
        determining whether the parameter includes a space; and
        in the event that the parameter includes the space,
      determine that the parameter is invalid; and
      in the event that the parameter is not the web service alias field,
    determining that the parameter is valid;
in the event that the parameters of the selection of the one or more field types do not pass validation, rejecting the new custom field, wherein rejecting the new custom field comprises providing a validation error with a message of an invalid parameter of the selection; and
in the event that the parameters of the selection pass validation, adding the new custom field to the existing object to create the custom object; and
receiving a request to create a new instance of the custom field for a specific custom object;
determining whether the new instance is allowed based at least in part on the indication of whether multiple instances of the new custom field are allowed;
in the event that the new instance is allowed, allowing the new instance; and
in the event that the new instance is not allowed, not allowing the new instance.

19. The system as in claim 1, wherein rejecting the custom field comprises not allowing the selection to be saved and provided as a custom field to the custom object.

20. The system as in claim 1, wherein in the event that the new instance is allowed, receiving the data value that is used to distinguish multiple instances of the custom object.

* * * * *